United States Patent
Luo et al.

(10) Patent No.: US 12,363,753 B2
(45) Date of Patent: *Jul. 15, 2025

(54) RESOURCE APPLICATION AND ALLOCATION METHOD, UE, NETWORK CONTROL UNIT, AND STORAGE MEDIUM

(71) Applicant: ZTE Corporation, Guangdong (CN)

(72) Inventors: Wei Luo, Shenzhen (CN); Lin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,454

(22) Filed: Oct. 20, 2023

(65) Prior Publication Data

US 2024/0049274 A1    Feb. 8, 2024

Related U.S. Application Data

(63) Continuation of application No. 16/075,118, filed on Dec. 27, 2018, now Pat. No. 11,818,747, which is a (Continued)

(30) Foreign Application Priority Data

Feb. 3, 2016 (CN) .......................... 201610077663.2

(51) Int. Cl.
*H04W 72/56* (2023.01)
*H04W 4/02* (2018.01)
(Continued)

(52) U.S. Cl.
CPC ........... *H04W 72/56* (2023.01); *H04W 4/022* (2013.01); *H04W 4/027* (2013.01); *H04W 4/40* (2018.02);
(Continued)

(58) Field of Classification Search
CPC ....... H04W 4/022; H04W 4/027; H04W 4/40; H04W 4/44; H04W 72/0446; H04W 72/21

See application file for complete search history.

(56) References Cited

U.S. PATENT DOCUMENTS

| 2010/0128742 A1 | 5/2010 | Chun et al. | |
| 2017/0134080 A1* | 5/2017 | Rahman | H04B 7/0456 |
| 2019/0037539 A1* | 1/2019 | Jung | H04W 4/48 |

FOREIGN PATENT DOCUMENTS

| CN | 102647263 A | 8/2012 |
| CN | 103220110 A | 7/2013 |

(Continued)

OTHER PUBLICATIONS

International Search Report and Written Opinion for PCT Appl. No. PCT/CN2017/072472 mailed Mar. 24, 2017 (with English translation, 12 pages).

(Continued)

*Primary Examiner* — Zhensheng Zhang
(74) *Attorney, Agent, or Firm* — Foley & Lardner LLP

(57) ABSTRACT

Provided are a resource request method and device, and the method includes: transmitting low latency traffic information to a network control unit; and receiving resource allocation information formed from resource allocation performed by the network control unit based on the low latency traffic information. Embodiments of the present disclosure provide a computer storage medium.

17 Claims, 5 Drawing Sheets

Related U.S. Application Data continuation of application No. PCT/CN2017/072472, filed on Jan. 24, 2017.

(51) Int. Cl.
  *H04W 4/021* (2018.01)
  *H04W 4/40* (2018.01)
  *H04W 4/44* (2018.01)
  *H04W 72/0446* (2023.01)
  *H04W 72/23* (2023.01)
  *H04W 72/51* (2023.01)
  *H04W 72/21* (2023.01)

(52) U.S. Cl.
  CPC ......... *H04W 4/44* (2018.02); *H04W 72/0446* (2013.01); *H04W 72/23* (2023.01); *H04W 72/51* (2023.01); *H04W 72/21* (2023.01)

(56) References Cited

FOREIGN PATENT DOCUMENTS

| | | |
|---|---|---|
| CN | 103813458 A | 5/2014 |
| CN | 106559732 A | 4/2017 |
| EP | 1 816 807 A1 | 8/2007 |
| EP | 3 242 449 B1 | 3/2019 |

OTHER PUBLICATIONS

MMT (Information technology—High efficiency coding and media delivery in heterogeneous environments—Part 1: MPEG media transport (MMT), ISO/IEC CD 23008-1, 2012) Jul. 20, 2012 (70 pages).

* cited by examiner

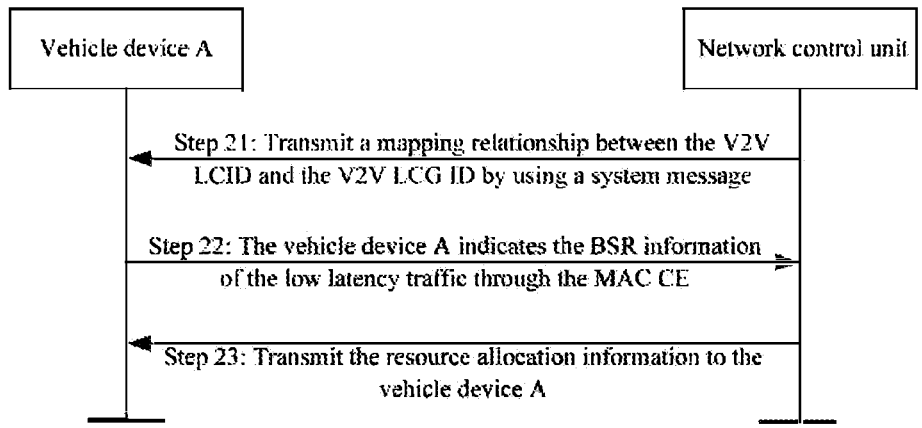
FIG. 7
FIG. 8
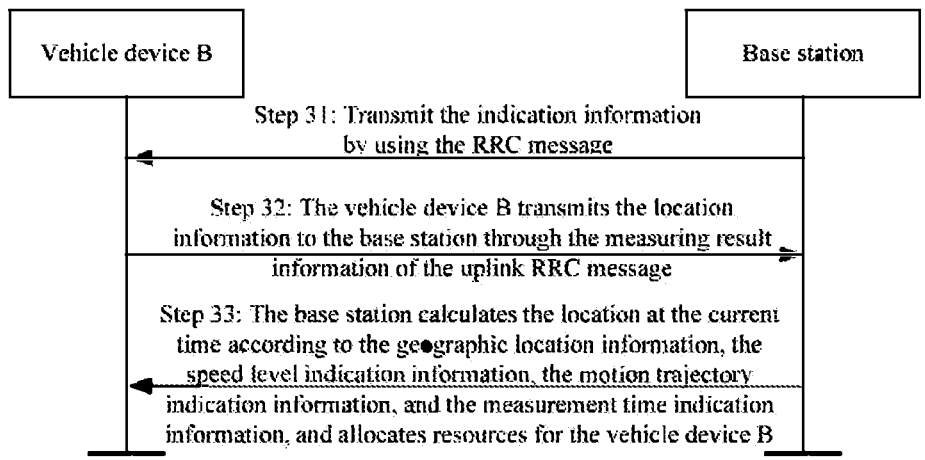
FIG. 9
FIG. 10

RESOURCE APPLICATION AND ALLOCATION METHOD, UE, NETWORK CONTROL UNIT, AND STORAGE MEDIUM

CROSS REFERENCE TO RELATED APPLICATION

This application is a continuation of U.S. patent application Ser. No. 16/075,118 filed on Dec. 27, 2018, which is a national stage application, filed under 37 U.S.C. 371, of International Patent Application NO. PCT/CN2017/072472, filed on Jan. 24, 2017, which claims priority to Chinese patent application NO. CN201610077663.2 filed on Feb. 3, 2016, contents of all of which are incorporated herein by reference in their entireties.

TECHNICAL FIELD

The present disclosure relates to resource request and allocation technologies in a communication field, and in particular, to a resource request method, a resource allocation method, a user equipment (UE), a network control unit, and a storage medium.

BACKGROUND

With an increase in vehicles, how to reduce traffic accidents, and how to timely mount a rescue and coordinate on-site traffic after traffic accidents are problems that need to be solved in existing traffic. With the development of communication technologies and electronic technologies, in-vehicle devices are configured on vehicles for performing various information interactions, for example, the information may be accident warning information, traffic condition prompt information, and the like. It has become a new way for countries to try to solve road traffic safety problems by using a communication-based collision warning system, which employs advanced wireless communication technologies and a new generation of information processing technologies, to implement real-time information interactions between vehicles and between vehicles and roadside infrastructure, to inform each other of the current status (including position, speed, accelerated speed and traveling path of the vehicle) and the known road environment information, to cooperatively acquire road hazard conditions, and to provide various types of collision warning information in time to prevent road traffic safety accidents.

Vehicle-to-Everything Communications (V2X) refers to providing vehicle information through sensors, in-vehicle terminals and electronic tags mounted on vehicles, implementing Vehicle-to-Vehicle Communication (V2V), Vehicle-to-Pedestrian Communications (V2P), Vehicle-to-Infrastructure Communications (V2I) and Vehicle-to-Infrastructure/Network Communications (V2I/V2N) by using various communication technologies, and effectively using information by way of extraction, sharing, etc. and effectively controlling and providing comprehensive services for vehicles on an information network platform.

Currently, the 3rd Generation Partnership Project (3GPP) is discussing the V2X based on Long Term Evolution (LTE). According to the current definition of 3GPP, the V2X traffic is a communication service that transmits or receives information with the participation of UEs through 3GPP by use of a V2V application. Based on the other party participating in the communication, the V2X traffic may be further divided into a V2V traffic, a V2I traffic, a V2P traffic, and a V2N traffic. The V2P traffic refers to a traffic that uses a V2P application for communication between UEs. The V2N traffic refers to a traffic in which a UE and a service entity use a V2N application to communicate with each other through an LTE network entity. The V2I traffic refers to a traffic in which a UE and a Road Side Unit (RSU) use a V2I application for interaction. The RSU is an entity that supports the V2I traffic, may send the V2I traffic to UEs that use the V2I application, or may receive the V2I traffic from UEs that use the V2I traffic. The RSU may be implemented by a base station (eNB) or a stationary UE. If implemented by a base station, the RSU is called an eNB type RSU. If implemented by a UE, the RSU is called a UE type RSU. The V2V traffic refers to a service that uses a V2V application for communication between UEs. V2V includes the V2V-related application information directly interacted between UEs, or the V2V-related application information interactions between UEs through infrastructure (for example, the RSU, an application server, and the like) that supports the V2X traffic due to a limitation of direct communication range in V2V.

In addition, 3GPP also discusses three scenarios of V2V, as shown in FIGS. 1A-1D.

Scenario 1 is a scenario that supports V2V communication based only on a PC5 interface. A UE sends a V2X message to multiple UEs in the local area through the PC5 interface.

Scenario 2 is a scenario that supports V2V communication based only on a Uu interface. The UE transmits, via uplink, a V2X message to the enhancements for Evolved Universal Terrestrial Radio Access Network (E-UTRAN), and the E-UTRAN broadcasts, via downlink, the V2X message to multiple UEs in the local area.

Scenario 3 is a scenario that may be further divided into Scenario 3a and Scenario 3b, and supports V2V communication by using a Uu interface and a PC5 interface. The UE sends the V2X message to other UEs through the PC5 interface. A terminal type Remote Subscriber Unit (RSU) receives the V2X message from the PC5 interface and transmits the V2X message to the E-UTRAN via uplink. The E-UTRAN broadcasts, via downlink, the V2X message received from the terminal type RSU to a plurality of UEs in the local area. Alternatively, the UE sends the V2X message to the E-UTRAN via uplink, the E-UTRAN transmits the V2X message to one or more terminal type RSUs after receiving the V2X message from the Uu interface, and the terminal type RSU transmits the V2X message received from the E-UTRAN to multiple UEs in the local area through the PC5 interface.

On one hand, according to the current discussion, the latency requirement of most V2V/V2I/V2P traffic is 100 milliseconds or even 20 milliseconds. However, the latency requirement may not be satisfied by using the existing uplink cellular and PC5 interface resource allocation modes, and especially for scenario 3, the latency requirement cannot be met according to the existing resource allocation method.

On the other hand, if receiving and transmitting parties use the same frequency band for communication and the two parties send messages at the same sub-frame location when using the PC5 interface for communication, the two parties cannot receive information from each other at the same time due to the influence of half-duplex, which leads to a missing of messages from other terminals. This above situation cannot be completely avoided even if a retransmission solution is used. If the number of retransmissions is too large, excessive latency will be caused, which is beyond the latency requirement.

SUMMARY

In view of the above, a resource request method, a resource allocation method, a UE, a network control unit, and a storage medium that embodiments of the present disclosure are expected to provide at least partially solve the above-mentioned problems.

The technical solution of the present disclosure is implemented as follows.

A first aspect of embodiments of the present disclosure provides a resource request method, including: transmitting low latency traffic information to a network control unit; and receiving resource allocation information formed from the resource allocation performed by the network control unit based on the low latency traffic information.

A second aspect of embodiments of the present disclosure provides a resource allocation method, including: receiving low latency traffic information transmitted by a user equipment (UE); performing resource allocation according to the low latency traffic information to achieve a result of the resource allocation; and transmitting resource allocation information to the UE according to the result of the resource allocation.

A third aspect of embodiments of the present disclosure provides a UE, including: a first transmitting unit, configured to transmit low latency traffic information to a network control unit; and a first receiving unit, configured to receive resource allocation information formed from resource allocation performed by the network control unit based on the low latency traffic information.

A fourth aspect of embodiments of the present disclosure provides a network control unit, including: a second receiving unit, configured to receive low latency traffic information transmitted by a UE; an allocating unit, configured to perform resource allocation according to the low latency traffic information to achieve a result of the resource allocation; and a second transmitting unit, configured to transmit resource allocation information to the UE based on the result of the resource allocation.

A fifth aspect of embodiments of the present disclosure provides a non-transitory computer storage medium, which is configured to store computer-executable instructions for executing the above resource request methods.

For the resource request method, resource allocation method, the UE, the network control unit, and the computer storage medium provided by the embodiments of the present disclosure, the UE transmits low latency traffic information to the network control unit, so that the network control unit allocates resources according to the low latency traffic information, and the allocated resources can meet the low latency requirements of low latency traffic.

BRIEF DESCRIPTION OF DRAWINGS

FIGS. 7 and 8 are schematic diagrams of signaling formats of a MAC CE according to an embodiment of the present invention.

FIG. 9 is a flowchart of a fourth resource request method according to an embodiment of the present disclosure.

FIG. 10 is a flowchart of a fifth resource request method according to an embodiment of the present disclosure.

DETAILED DESCRIPTION

The technical solution of the present disclosure is further described in conjunction with the following embodiments and accompanying drawings. It is to be understood that preferred embodiments described herein are intended to explain and not to limit the present disclosure.

Embodiment 1

Figure 1A:
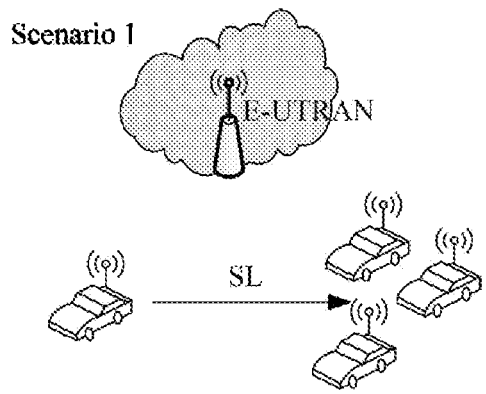
FIGS. 1A-1D are schematic diagrams of V2X application scenarios according to an embodiment of the present disclosure.
Figure 1B:
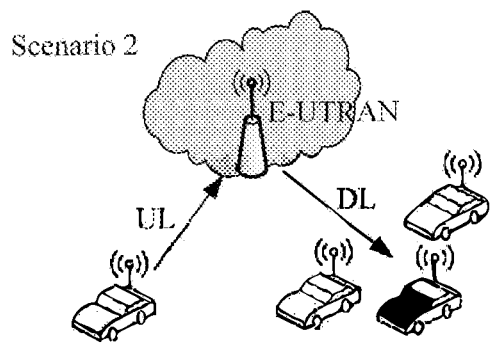
Figure 1C:
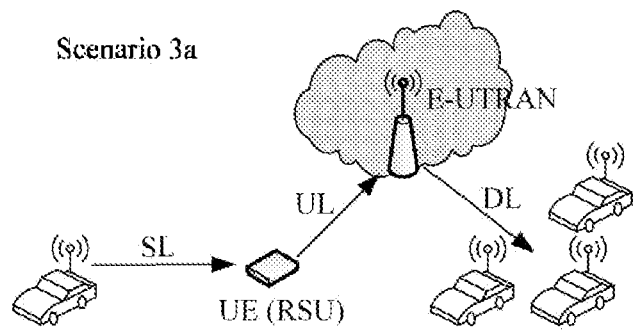
Figure 1D:
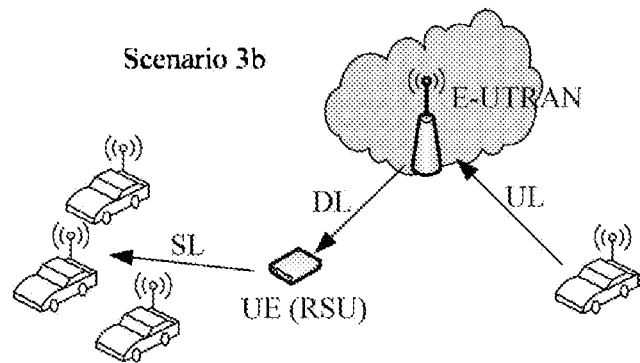
Figure 2:
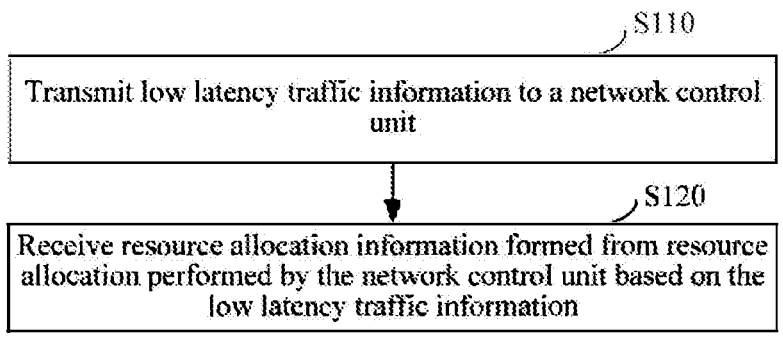
FIG. 2 is a flowchart of a first resource request method according to an embodiment of the present disclosure.

As shown in FIG. 2, an embodiment provides a resource request method, including steps described below.

In S110, low latency traffic information is transmitted to a network control unit.

In S120, resource allocation information is received, and the resource allocation information is formed from resource allocation performed by the network control unit based on the low latency traffic information.

An execution subject of the resource request method described in the embodiment may be various UEs, for example, various vehicle-mounted devices.

In the embodiment, the low latency traffic information may include information related to various types of low latency traffic (which may also be referred to as low latency traffic patterns), and may be used as a basis concerning latency for the network control unit to allocate resources. The low latency traffic information may indicate the low latency traffic, and then the network control unit determines a latency requirement of the low latency traffic; or the low latency traffic information may directly characterize the latency requirement of the low latency traffic. In the embodiment, the low latency traffic may include a traffic corresponding to the low latency traffic information of the V2X, including the vehicle and any communication device V2X traffic.

In the embodiment, the network control unit may include a base station, a roadside unit, a relay, or a terminal capable of resource allocation.

In S120, the resource allocation information transmitted by the network control unit is received. After receiving the resource allocation information, the UE can acquire whether a communication resource for transmitting the low latency traffic information is currently allocated and various parameters such as the size and type of the allocated communication resources according to the resource allocation information. The type of the allocated communication resources herein may include various resources such as time-frequency resources and code resources, where the code resources herein may include various sequence resources such as scrambling code resources. The size of the allocated communication resources herein may include the quantity of time slots, a bandwidth of frequency resource, the quantity of scrambling codes, and the like. In this way, the UE may subsequently transmit a traffic content of the low latency traffic on the corresponding communication resource according to the resource allocation information.

In the embodiment, when requesting a resource allocation for a low latency traffic, the UE sends not only a resource allocation request but also the low latency traffic information to the network control unit, so that the network control unit may allocate resources according to the requirement of resource allocation characterized by the low latency traffic information, and meet the low latency requirement of the low latency traffic as much as possible when performing resource allocation. In this way, compared to the regular or high latency traffic, communication resources can be allocated to the low latency traffic faster and the communication resources can be used in a more timely manner for communication, thereby achieving low latency.

Further, the low latency traffic information includes one or more of the following various types of information.

The first is low latency traffic type information. The low latency traffic type information is used for indicating a type of the low latency traffic. The type of the low latency traffic includes V2X traffic. The V2X traffic may include V2V traffic, V2I traffic, V2P traffic, or V2N traffic. Therefore, the low latency traffic type information described in the embodiment may include one piece or more of the following information: Vehicle-to-Everything traffic type information, which is at least used for indicating a type of the V2X traffic; Vehicle-to-Vehicle Communication (V2V) traffic type information, which is at least used for indicating a type of the V2V traffic; Vehicle-to-Infrastructure Communications (V2I) traffic type information, which is at least used for indicating a type of the V2I traffic; Vehicle-to-Pedestrian Communications (V2P) traffic type information, which is at least used for indicating a type of the V2P traffic; Vehicle-to-Network Communications (V2N) traffic type information, which is at least used for indicating a type of the V2N traffic; event triggering traffic type information, which is used for indicating various types of low latency traffic triggered when a specified event occurs, for example, a type of the V2X traffic triggered when a specified event occurs; and periodically transmitting traffic type information, which is at least used for indicating various types of low latency traffic transmitted periodically, for example, a type of the V2X traffic transmitted periodically.

Various types of V2X traffic are described in the embodiment such as the type of the V2X traffic, the type of the V2V traffic, and the like.

The second is a low latency traffic priority (which may be also referred to as priority information), which is used for indicating a priority of the type of the low latency traffic.

The third is a first Quality of Service (QoS) Class Identifier (QCI) indication information, where the first QCI indication information is used for indicating a latency and/or a reliability requirement level of a low latency traffic.

The fourth is moving speed level indication information, which is used for indicating a moving speed level of a UE.

The fifth is resource type indication information, where the resource type information is used for indicating a resource type required by the low latency traffic. The resource type indication information may include interface type indication information, where the interface type indication information herein may include Uu interface type indication information, and/or PC5 interface type indication information. The Uu interface type indication information may at least be used for indicating a Uu interface resource, and the PC5 interface type indication information may at least be used for indicating a PC5 interface resource.

The sixth is resource period information (which may be also referred to as resource periodicity), which is used for indicating a transmission period of low latency traffic information that is periodically transmitted.

The seventh is resource pattern information, including an expected sub-frame offset information to be allocated (that is, the offset information (which may also be referred to as the offset) is used for indicating an expected sub-frame to be allocated).

The eighth is resource size information, which is used for indicating a size of resources to be allocated.

The ninth is positioning information, which is used for determining location information of a UE. In the embodiment, the positioning information may include at least one piece of the following information: geographic location information of the UE, which is used for indicating a geographic location when the UE is ready for sending the low latency traffic information; a moving speed of the UE, a moving speed of the UE relative to the ground or relative to a network equipment capable of providing communication services, where the moving speed may be an absolute value of the moving speed, or may be information such as a level to which the moving speed belongs; motion trajectory of the UE, where the motion trajectory of the UE herein may be a predicted motion trajectory at the moving speed after the current moment; geographic location measurement time of the UE, where the geographical location measurement time herein is the time when the UE determines the foregoing geographical location information.

The tenth is the first logical channel identity (LCID) information, which is used for indicating a logical channel or a logical channel group (LCG) that uses resources. The logical channel identity herein may be a logical channel or a logical channel group for indicating semi-persistent scheduling resources.

The eleventh is Buffer State Report (BSR) information, which is used for indicating buffer state information of the low latency traffic for which the resources are requested.

In a specific implementation, the positioning information further includes the following information: location identity information, determined based on a current geographic location of the UE and geographic area range identity mapping information, and the geographic area range identity mapping information is used for characterizing mapping relationships between the geographic area and the location identity.

For example, the base station partitions cells formed by its coverage again, partitions the cells into multiple geographical areas, and sets location identities for these geographical areas. In the embodiment, the location identity may be a location identity of a cell where the UE is located. Each of the location identities can represent a geographic area. In this case, the base station, as the network control unit, can determine in which geographical area of the cell formed by the coverage of the base station the UE is located after receiving the location identity transmitted by the UE.

The method further includes receiving geographic area range identity mapping information transmitted by the network control unit.

In the embodiment, the network control unit will transmit the geographic area range identity mapping information before receiving the low latency traffic information. For example, the network control unit transmits the geographical area range identity mapping information by broadcasting or multicast. For another example, the UE receives the geographic area range identity mapping information by receiving a system message or a proprietary message transmitted by the network control unit. In the embodiment, the proprietary message may include a proprietary Radio Resource Control (RRC) message.

In a specific implementation process, there are many types of geographical areas. In the embodiment, the geographic areas are divided according to the shape of the areas, and may include a circular area and a rectangular area. At this time, the geographic area range identity mapping information includes at least one of the following: a central location list, radius information and a location identity of the circular area; and location information of three vertices and a location identity of the rectangular area.

For the circular area, after the UE detects the direct geographic location, the UE compares the location information of its own with the central location of the circular area, and determines the circular area where the UE is currently located according to the radius information of the circular area. The UE transmits the location identity of the circular area to the network control unit after determining the circular area where the UE is currently located.

For the rectangular area, after the UE detects a direct geographic location, the UE compares the location information of its own with the location information of the three vertices of the rectangular area and achieves a comparison result. The UE determines the rectangular area where the UE is located according to the comparison result. The UE transmits the location identity of the rectangular area to the network control unit after determining the rectangular area where the UE is located.

In the embodiment, the step S110 may specifically include information described below.

The low latency traffic information is transmitted by using the radio resource control (RRC) message.

The RRC message herein may include messages such as a side-link UE information message, a UE information response message, a low latency traffic indication message, or V2X service indication information. Therefore, the step S110 may specifically include that the low latency traffic information is transmitted by using at least one of the Side-link UE Infomation message, a UE Information Response message, the low latency traffic indication message, and the V2X traffic indication information.

Of course in the embodiment, the step S110 may further include that the Media Access Control (MAC) Control Element (CE) carrying the low latency traffic information is transmitted to the network control unit.

In summary, in the embodiment, the UE transmits at least the low latency traffic information to the network control unit when requesting the resource of the low latency traffic, and the network control unit can conveniently allocate corresponding resources according to the low latency traffic information, thereby meeting the latency requirements of the transmission of the low latency traffic information.

Embodiment 2

Figure 3:
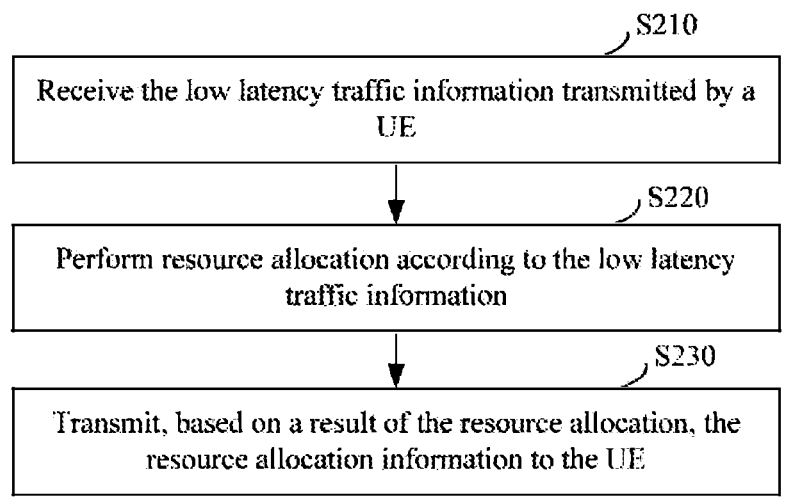
FIG. 3 is a flowchart of a second resource request method according to an embodiment of the present disclosure.

As shown in FIG. 3, an embodiment provides a resource allocation method, including steps described below.

In S210, low latency traffic information transmitted by a UE is received.

In S220, resource allocation is performed according to the low latency traffic information, and a result of the resource allocation is achieved.

In S230, Resource allocation information is transmitted to the UE according to the result of the resource allocation.

The method described in the embodiment is applied to the network control unit. In the embodiment, the network control unit may be a communication node capable of resource scheduling or allocation, such as a base station, a roadside unit, or a relay node. In the embodiment, the low latency traffic may include the aforementioned V2X traffic.

When allocating resources in response to a resource request, the network control unit described in the embodiment performs the resource allocation according to the low latency traffic information to meet the resource requirements of low latency traffic as much as possible, for example, to meet the latency requirement of resources.

Resource allocation will be performed in S220, and resource allocation information will be transmitted to the UE based on the result of the resource allocation in S230. In this way, the UE transmits a traffic content of the low latency traffic on the corresponding resource according to the resource allocation information.

In summary, in the embodiment, the network control unit can also receive low latency traffic information when responding to the resource request, and the low latency traffic information is an allocation basis on which the network control unit allocates resources. This makes it possible to distinguish low latency traffic from common latency traffic to meet low latency requirement of low latency traffic.

The content of the low latency traffic information is specifically described below. The low latency traffic information includes at least one of the following information.

Low latency traffic type information is used for indicating a type of the low latency traffic.

A low latency traffic priority is used for indicating a priority of a type of the low latency traffic.

A first Quality of Service (QoS) Class Identifier (QCI) indication information is used for indicating a latency and/or a reliability requirement level of the low latency traffic.

Moving speed level indication information is used for indicating a moving speed level of a UE, where the moving speed information includes the moving speed and/or the moving speed level of the UE.

Resource type indication information is used for indicating a resource type required by the low latency traffic.

Resource period information is used for indicating a transmission period of low latency traffic information that is periodically transmitted.

Resource pattern information includes an expected sub-frame offset information to be allocated.

Resource size information is used for indicating a size of resources to be allocated.

Positioning information is used for determining location information of a UE. The positioning information herein may include geographic location information of the UE, moving speed of the UE, motion trajectory of the UE, and geographic location measurement time for determining the geographic location of the UE. Of course the positioning information further includes location identity information. The location identity information is determined based on a current geographic location of the UE and geographic area range identity mapping information. The geographic area range identity mapping information is used for characterizing mapping relationships between the geographic area and the location identity.

A first logical channel identity information is used for indicating a logical channel or a logical channel group that uses resources. For example, the first logical channel identity may be a logical channel or a logical channel identity for indicating the available semi-persistent resources (which may be also referred to as semi-persistent scheduling resources).

Buffer state report (BSR) information is used for indicating buffer state information of a low latency traffic for which the resources are requested.

When performing the resource allocation, the network control unit determines different resource allocation parameters according to different low latency traffic information. The following describes the operation of resource allocation according to different low latency traffic information in the step S220. The step S220 may include at least one piece of the following information.

The size of resources, the resource period, and the latency requirement required to be allocated are determined according to the low latency traffic type information.

The size of resources, the resource period, and the latency requirement required to be allocated are determined according to the low latency traffic information and the low latency traffic priority or the first QCI indication information. For example, the first QCI indication information described in the embodiment may be used for indicating the QCI level of the available semi-persistent resources.

The geographic location at which the UE transmits the low latency traffic is predicted according to the positioning information, and different sub-frame resources are respectively allocated to two UEs within a specified distance range according to the geographic location.

The resource type required to be allocated is determined according to the resource type indication information, and the resource allocation is performed according to the resource type.

The transmission period of the resources required to be allocated is determined according to the resource period information, and resource allocation is performed according to the transmission period.

The expected sub-frame offset information to be allocated is determined according to the resource pattern information, and sub-frame resources are allocated according to the expected sub-frame offset information.

The size of resources required to be allocated is determined according to the resource size information, and resource allocation is performed according to the size of resources.

The logical channel identity or the logical channel identity group of allocated resources is determined according to the first logical channel identity information, and resources corresponding to the logical channel identity or logical channel identity group are allocated to the low latency traffic for which the resources are requested.

The size of required resources is determined according to buffer capacity information.

When the low latency traffic information includes the positioning information, the method further includes: the geographic area range identity mapping information is transmitted.

In the embodiment, the network unit transmits the geographic area range identity mapping information, so that the UE determines the geographic area where the UE is located after receiving the geographic area range identity mapping information.

For example, the network control unit may transmit the geographic area range identity mapping information through various broadcast messages or multicast messages, for example, the geographical area range identity mapping information is transmitted through a system message, such that the UE within the coverage of a wireless signal of the network control unit may receive the geographical area range identity mapping information.

The step that the geographic location of the UE is determined according to the positioning information in the S220 may include information described below.

The geographic location at which the UE transmits the low latency traffic is predicted according to at least one of the geographic location information of the UE, the moving speed of the UE, the motion trajectory of the UE, and the geographic location measurement time for determining the geographic location of the UE. As a further improvement of the embodiment, the step S220 herein may further include that: different sub-frame resources are allocated to two UEs within a specified range according to the geographic location, thereby avoiding co-channel interferences, reducing retransmission and improving the response rate of the traffic.

The step S220 may include that: resource allocation of the semi-persistent resources is performed according to the low latency traffic information. The step S230 may include that: resource allocation information of one or more semi-persistent resources is transmitted. In the embodiment, the resource allocation performed by the network control unit is a resource allocation of semi-persistent resources.

Specifically, the semi-persistent scheduling configuration information (which may also be referred to as resource allocation information of the semi-persistent resources) includes at least one of the following information.

The semi-persistent resource type information is used for indicating a type of an interface used by the semi-persistent resources. The interface type herein may include a Uu interface or a PC5 interface.

The traffic type information using semi-persistent resources is used for indicating the type of the low latency traffic using the semi-persistent resources. In the embodiment, the currently allocated semi-persistent resources may be used by which services. For example, the V2V traffic and V2N traffic of the V2X traffic may be specified to use the allocated semi-persistent resources according to the traffic type information using the semi-persistent resources.

In the embodiment, the semi-persistent scheduling configuration information further includes at least one of the following information.

The second QCI indication information is used for indicating a QCI level of the traffic of the available semi-persistent resources. Second logical channel information is used for indicating a logical channel or a logical channel group of the available semi-persistent resources.

In the embodiment of the present disclosure, "first" and "second" have no special meaning, just to distinguish the QCI indication information or logical channel information and the like transmitted by different network elements.

In this case, when performing the resource allocation, the UE can determine the QCI level, the logical channel information, the logical channel group information and the like of the available semi-persistent resources according to the second QCI indication information.

For the transmission of the resource allocation information of one or more semi-persistent resources, the radio resource control (RRC) message is used for transmitting the resource allocation information of the semi-persistent resources. The type of the message specifically included in the RRC message herein may refer to the previous embodiment.

In summary, the resource allocation method in the embodiment performs the resource allocation by receiving the low latency traffic information, thereby meeting low latency requirement of low latency traffic.

Embodiment 3

Figure 4:
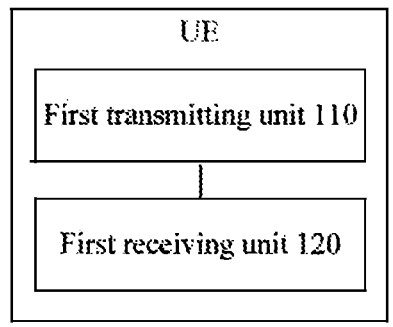
FIG. 4 is a structural diagram of a UE according to an embodiment of the present disclosure.

As shown in FIG. 4, an embodiment provides a UE, including: a first transmitting unit 110 and a first receiving unit 120.

The first transmitting unit 110 is configured to transmit low latency traffic information to a network control unit.

The first receiving unit 120 is configured to receive resource allocation information formed from resource allocation performed by the network control unit based on the low latency traffic information.

The UE provided in the embodiment may be one of various terminal devices such as vehicle-mounted devices.

The first transmitting unit 110 and the first receiving unit 120 both correspond to communication interfaces. In the embodiment, the communication interfaces are usually wireless interfaces, such as mobile antenna of vehicle-mounted devices and the like.

In the embodiment, when the UE requests resources, the first transmitting unit 110 not only transmits the resource request, but also transmits the low latency traffic information, so that the network control unit can easily performs the resource allocation based on the low latency traffic information, thereby meeting the latency requirement of low latency traffic.

The content of the low latency traffic information in the embodiment may be referred to Embodiment 1 or Embodiment 2, and is not repeated here.

The first receiving unit 120 is further configured to receive geographic area range identity mapping information transmitted by the network control unit. The first transmitting unit 110 is further configured to transmit location identity information in the low latency traffic information, where the location identity information is determined based on a current geographic location of the UE and the geographic area range identity mapping information, and the geographic area range identity mapping information is used for characterizing a mapping relationship between a geographic area and a location identity.

In the embodiment, the first receiving unit 120 of the UE receives the geographic area range identity mapping information, so that the UE locates its current geographic location through various positioning structures such as a Global Position System (GPS) chip. Various processing chips of the UE, such as a central processing unit (CPU), a microprocessor, or a digital signal processor, determines the geographic area location identity corresponding to the location of the UE according to the geographic area range identity mapping information. The UE transmits the location identity to the network control unit, and the network control unit knows the location of the UE. This facilitates the network control unit to allocate resources according to the location of each UE, and avoids problems such as co-channel interference.

In summary, the UE described in the embodiment may be used to implement one or more technical solutions of the resource request method in Embodiment 1, to transmit the low latency traffic information based on which the network control unit can allocate resources, thereby reducing problems that a large latency of the low latency traffic is caused due to a late allocation and a latency in the use of resources.

Embodiment 4

Figure 5:
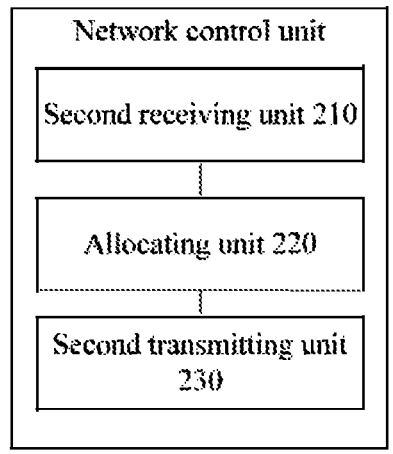
FIG. 5 is a structural diagram of a network control unit according to an embodiment of the present invention.

As shown in FIG. 5, an embodiment provides a network control unit, including: a second receiving unit 210, an allocating unit 220 and a second transmitting unit 230.

The second receiving unit 210 is configured to receive low latency traffic information transmitted by a UE.

The allocating unit 220 is configured to perform resource allocation according to the low latency traffic information.

The second transmitting unit 230 is configured to transmit resource allocation information to the UE based on a result of the resource allocation.

The network control unit described in the embodiment may include various communication nodes capable of allocating resources, such as a base station, a relay node, or a roadside unit.

The second receiving unit 210 and the second transmitting unit 230 correspond to a communication interfaces, and the communication interfaces can perform information interaction with the UE.

In the embodiment, the second receiving unit 210 receives low latency traffic information, and the allocating unit 220 performs the resource allocation based on the low latency traffic information. The allocating unit 220 herein may correspond to various processors or processing circuits in the network control unit. The structure of the processor and the processing circuit herein may refer to the corresponding description in the foregoing embodiments.

In a specific implementation process, the second transmitting unit 230 is further configured to sending the geographic area range identity mapping information, etc., so that the UE determines the geographic area where the UE is currently located according to the geographic area range identity mapping information.

In summary, the network control unit described in the embodiment may be used to implement one or more technical solutions of the resource allocation method in Embodiment 2, receive the low latency traffic information, and perform the resource allocation based on the received low latency traffic information, thereby reducing problems that a large latency of the low latency traffic is caused due to the late allocation and the latency in the use of resources.

Several specific application examples are provided below in conjunction with any of the above embodiments.

Example 1

Figure 6:
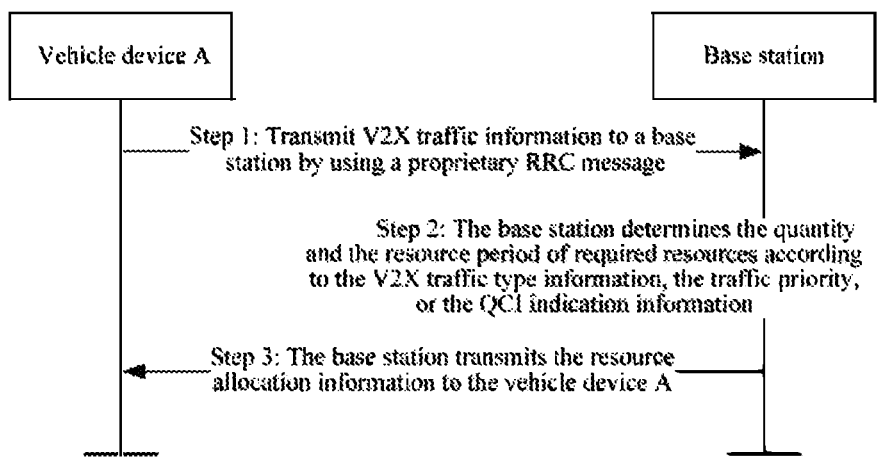
FIG. 6 is a flowchart of a third resource request method according to an embodiment of the present disclosure.

In the example, after being started, a vehicle device A is connected to the LTE network, and transmits V2X service information periodically to indicate a speed, motion trajectory, and the like, to surrounding vehicles. Therefore, the vehicle device A needs to send a request for requesting resource of transmitting V2X messages to the network side. The example is based on the foregoing resource request method and/or resource allocation method. As shown in FIG. 6, the following steps may be taken to request resources.

In step 1, the vehicle device A transmits V2X traffic information to a base station by using a proprietary RRC message, where the V2X traffic information includes: V2X traffic type information, the low latency traffic priority, QCI indication information, resource type indication information, and/or speed information.

The V2X traffic type information includes: Vehicle-to-Everything service type information, V2V traffic type information, V2I traffic type information, V2P traffic type information, V2N traffic type information, event triggering traffic type information, and periodically transmitting traffic type information.

The low latency traffic priority is used for indicating a priority of the low latency traffic.

The QCI indication information is used for indicating a priority and a latency requirement level of the low latency traffic.

The RRC message may include a side-link UE information message, a UE information response message, a low latency traffic indication message, or V2X traffic indication information.

In step 2, the base station determines the size and the resource period of required resources according to the V2X traffic type information, the low latency traffic priority, or the QCI indication information. If V2X traffic type information further includes speed level information, the base station further needs to determine the resource period of required resources according to the speed level information.

The base station determines, according to the resource type indication information, whether the vehicle device A requests a PC5 resource or a Uu resource, thereby determining the transmitted range of the resource pool for the vehicle device A, and allocates a time-frequency resources to the vehicle device A in conjunction with the resource size and the resource period.

In step 3, the base station transmits the resource allocation information to the vehicle device A. Specifically, if traffic type information reported by the vehicle device A indicates that the information is periodically transmitted information, the base station transmits one or more semi-persistent scheduling configuration information by using the proprietary RRC message. The semi-persistent scheduling configuration information includes the following information.

The resource type indication information of the semi-persistent resource is used for indicating whether the scheduled semi-persistent resource is transmitted through the PC5 interface or the Uu interface.

The traffic type information using the semi-persistent resource is used for indicating which traffic information is transmitted by using the scheduled semi-persistent resource, and includes specific low latency traffic type information, for example, Vehicle-to-Everything traffic type information, V2V traffic type information, V2I traffic type information, V2P traffic type information, V2N traffic type information, event triggering traffic type information, and periodically transmitting traffic type information, or more specifically the traffic type information includes emergency vehicle warning information, road safety service information, and the like.

Further, step 3 may be followed by step 4. In step 4, the vehicle device A receives the allocation information allocated by the base station, determines transmitting resources according to the resource allocation information, and transmits V2X messages on the transmitting resources.

Example 2

The difference between the Example 2 and Example 1 is described as follows.

In step 1, the low latency traffic information transmitted by the vehicle device A may further include: resource type indication information, resource period information, resource pattern information, and resource size information.

In step 2, after receiving the above information, the base station may determine the sub-frame pattern that the vehicle device A needs to be allocated according to the resource pattern information. The base station allocates resources according to the requirement of the vehicle device A such that the allocated sub-frame position is consistent with the time when the vehicle device A generates the V2X message. For example, according to the requirement plan, the vehicle device A generates the V2X message in the nth sub-frame and transmits the V2X message to the underlying layer, and the base station allocates the (n+1)th sub-frame to the vehicle device A, thereby minimizing the transmission latency.

Example 3

The example provides a resource allocation method, including steps described below.

In step 11, the vehicle device A carries the Buffer State Report (BSR) information of the low latency traffic through the MAC CE. The MAC sub-header corresponding to the MAC CE includes a proprietary logical channel identity (LCD).

Referring to FIG. 7, the BSR information of the low latency traffic includes the V2X LCID and buffer size of the low latency traffic. The buffer size herein may correspond to buffer capacity. Alternatively, referring to FIG. 8, the BSR information of the low latency traffic includes the logical channel group identity and the buffer capacity of the low latency traffic. The MAC CE shown in FIG. 7 includes 3 bytes, which are respectively byte 1, byte 2, and byte 3, and each byte is composed of a logical channel identity and a buffer size. The MAC CE shown in FIG. 8 includes 4 bytes, which are respectively byte 1, byte 2, byte 3, and byte 4.

In step 12, the base station determines that the MAC CE is used for indicating the BSR information of the low latency traffic through the proprietary LCID in the MAC Sub-header corresponding to the MAC CE. Then the base station determines resources that the vehicle device A request for transmitting the low latency traffic such as V2X, and allocates the time-frequency resources according to the size of the request resource and the latency traffic type priority determined by the LCID or the LCG ID.

In step 13, the base station transmits the resource allocation information to the vehicle device A. If the information indicated by the V2X LCID or the LCG ID in step 1 is periodically transmitted information, the base station transmits one or more semi-persistent scheduling configuration information by using the proprietary RRC message. The semi-persistent scheduling configuration information includes: the resource type information and the traffic type information.

The resource type indication information is used for indicating whether the semi-persistent scheduling resource is transmitted through the PC5 interface or the Uu interface.

The traffic type information is used for indicating which traffic information is transmitted by using the semi-persistent scheduling resource, and includes specific low latency traffic type information, for example, Vehicle-to-Everything traffic type information, V2V traffic type information, V2I traffic type information, V2P traffic type information, V2N traffic type information, event triggering traffic type information, and periodically transmitting traffic type information, or more specifically the traffic type information further includes emergency vehicle warning information, road safety service information, and the like.

If the traffic type information reported by the vehicle device A in step 1 indicates that the message is an event triggering transmission message, the base station uses the proprietary Radio Network Temporary Identity (RNTI) of the V2X to scramble the resource allocation indication information, and transmits the dynamically scheduled resources through the physical downlink control channel.

In step 14, the vehicle device A receives the resource allocation information of the low latency traffic transmitted by the base station, determines the transmitting resources according to the resource allocation information, and transmits V2X messages on the transmitting resources.

Example 4

The network control unit on the network side (the network control unit here may be a base station or a high-level network element, and the high-level network element includes a V2X server, a V2X control function entity, a mobility management entity (MME), a gateway, etc.) allocates different V2X LCIDs for different V2X traffic, and partitions the different V2X LCIDs into different V2V LCGs according to different V2V traffic, such as event triggering traffic, periodically transmitting traffic, different periods, QCI requirements, etc. Specifically, the network side respectively allocates different V2V LCG IDs for the event triggering type V2X traffic and the periodically transmitting type V2X traffic. Further, for the event triggering type V2X messages, the network control units allocates different V2V LCG IDs according to different latency requirements, priority requirements, or QCI requirements. For periodically transmitting type V2X messages, the network control unit allocates different V2V LCG IDs according to different period requirements, priority requirements, or QCI requirements. As shown in FIG. 9, the method of the example further includes steps described below.

In step 21, the network control unit transmits a mapping relationship between the V2V LCID and the V2V LCG ID by using a system message.

In step 22, the vehicle device A indicates the BSR information of the low latency traffic through the MAC CE. The MAC sub-header corresponding to the MAC CE includes a proprietary LCD.

In step 23, the network control unit determines that the MAC CE is used for indicating the BSR information of the low latency traffic through the proprietary LCID in the MAC Sub-header corresponding to the MAC CE. Then the network control unit determines that the the resources requested by the vehicle device A is used for transmitting the low latency traffic such as V2X, and allocates the time-frequency resource according to the size of the request resource and the latency traffic type priority determined through the LCID or the LCG ID.

Further step 23 may be followed by step 24. In step 24, the network control unit transmits the resource allocation information to the vehicle device A. If the information indicated by the V2X LCID or the LCG ID in step 22 is periodically transmitted information, the base station transmits one or more semi-persistent scheduling configuration information by using the proprietary RRC message. The semi-persistent scheduling configuration information includes: the resource type information and the traffic type information.

The resource type indication information is used for indicating whether the semi-persistent scheduling resource is transmitted through the PC5 interface or the Uu interface.

The traffic type information is used for indicating which traffic information is transmitted by using the semi-persistent scheduling resource, and includes specific low latency traffic type information, for example, Vehicle-to-Everything traffic type information, V2V traffic type information, V2I traffic type information, V2P traffic type information, V2N traffic type information, event triggering traffic type information, and periodically transmitting traffic type information, or more specifically the traffic type information further includes emergency vehicle warning information, road safety service information, and the like.

In a specific implementation process, the network control unit uses the RNTI of the V2Xtraffic to scramble the resource allocation indication information to improve information security.

In step 25, the vehicle device A receives the resource allocation information of the low latency traffic transmitted by the network control unit, determines the transmitting resources according to the resource allocation information, and transmits V2X messages on the transmitting resources.

Example 5

In the example, the vehicle device B has a positioning function, acquires the location information of its own and transmits the location information to the base station. Since the V2X message transmitted by the vehicle device B needs to be correctly received by the vehicles surrounding the vehicle device B, and the vehicles surrounding the vehicle device B may also need to transmit V2X messages, the base station needs to allocate different sub-frames for geographically adjacent vehicles by considering the influence of half-duplex (the terminal cannot receive and transmit information simultaneously in the same frequency band of the same sub-frame).

If the geographic location is reported through the RRC message, the timeliness of reporting the geographic location is problematic (40 to 60 milliseconds) since the terminal is constantly moving. The speed, the motion trajectory, and the location measurement time information also need to be reported at the same time when the geographic location is reported. The base station determines the location information at which the terminal transmits the V2X message according to the reported speed, the motion trajectory, and the location measurement time, and avoids allocating the same sub-frame resource to geographically adjacent vehicles that are within the expected reception range of the V2X message transmitted from each other. Specifically, the process may refer to FIG. 10.

In step 31, the base station transmits the indication information by using the RRC message, where the indication information indicates the terminal to report the location information.

In step 32, the vehicle device B transmits the location information to the base station through the measuring result information of the uplink RRC message, where the location information includes: geographic location information, speed level indication information, motion trajectory information, and measurement time indication information.

In step 33, the base station calculates the location at the current time according to the geographic location information, the speed level indication information, the motion trajectory information, and the measurement time indication information, and allocates resources for the vehicle device B, thereby ensuring different sub-frames are allocated to the vehicle device B and the vehicles surrounding the vehicle device B and avoiding the influence of half-duplex.

Example 6

In the example, the vehicle device B has a positioning function, acquires the location information of its own in real time and transmits the location information to the base station. Since the V2X message transmitted by the vehicle device B needs to be correctly received by the vehicles surrounding the vehicle device B, and the vehicles surrounding the vehicle device B may also need to transmit V2X messages, the base station needs to allocate different sub-frames for geographically adjacent vehicles by considering the influence of half-duplex (the terminal cannot receive and transmit information simultaneously in the same frequency band of the same sub-frame).

The difference from Example 5 is that the vehicle device B in the example reports the location information through the MAC CE, which has stronger timeliness.

If the geographic location is indicated by way of the latitude and longitude and the northern and southern hemispheres, according to the definition of LTE in the existing art, the required overhead is 48 bits. However, the base station only needs to ensure that the different sub-frame resources are allocated to different terminals in a certain area, that is, the base station do not need to know too detailed location information. Therefore, in order to save overhead, the base station may further partition the area covered by each cell into smaller areas, and number each smaller area. For example, the base station partitions the cell into N small areas, and notifies the mapping relationship between the corresponding coordinates and the small area to the UE by broadcasting. The UE only needs to judge the small area where the UE is located, and reports the corresponding index to the base station, so that the overhead of reporting the geographical location information is greatly reduced. For example, when N is 64, only 6 bits are needed to indicate location information. Specific steps are described below.

The base station transmits geographic area range identity mapping information. Further, the base station transmits geographic area range identity mapping information by using a system message.

The following two mapping relationships may be included.

In mapping relationship 1, a list of the central location information and the radius information of the circular area are transmitted.

For example, the list of the central location information is as follows.

| Index 1 | Central location information 1 |
| Index 2 | Central location information 2 |
| Index 3 | Central location information 3 |
| . . . | . . . |

The geographical area range corresponding to each index is determined according to the geographical coordinates of the central location and the size of the radius.

In mapping relationship 2, position information of three points in a rectangular area is transmitted.

| Index 1 | Boundary location information 1-1, 1-2, 1-3 |
| Index 2 | Boundary location information 2-1, 2-2, 2-3 |
| Index 3 | Boundary location information 3-1, 3-2, 3-3 |
| . . . | . . . |

The geographical area range corresponding to each index is determined according to the geographic coordinates of the three boundary locations.

Among them, the index #1-index #N information may be not transmitted, and obtained by the sorted position.

After acquiring the location information, the vehicle device B determines, according to the geographic area range identity mapping information, which area range it belongs to, thereby determining the location information identity.

Figures 11, 12:
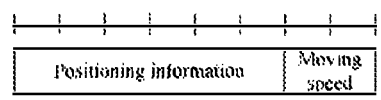
FIGS. 11 and 12 are schematic diagrams of signaling formats of a MAC CE according to an embodiment of the present invention.

The vehicle device B transmits the location information identity to the base station, including that the vehicle device B transmits the location information identity and/or the speed level information to the base station through the MAC CE. Or, the UE transmits the location information identity indication information to the base station through an uplink physical control channel. Or, the UE adds the location information to the BSR MAC CE of the low latency traffic. A BSR MAC CE format is shown in FIGS. 11 and 12. It should be noted that the BSR MAC CE format designed by the present disclosure does not only include the format shown in FIGS. 11 and 12, and any MACE CE format that includes location information identity; speed level information; LCD or LCG ID; and buffer size is within the scope of the present disclosure.

The base station determines the location information of the terminal that transmits the low latency traffic information according to the location identity information, and allocates resources to the vehicle device B, thereby ensuring that different sub-frames are allocated to the vehicle device B and the vehicles surrounding the vehicle device B and avoiding the influence of half-duplex.

An embodiment of the present disclosure provides a computer storage medium, which is configured to store computer-executable instructions for executing the resource request method provided by any one of the foregoing technical solutions, for example, used to execute the method shown in any one of FIGS. 2, 3, 6, 9, and 10.

The computer storage medium may include various storage media such as a random storage medium, a read only storage medium, flash memory, an optical disk, or a Digital Video Disk (DVD), and may be a non-transitory storage medium.

It is to be understood that the device and the method disclosed in embodiments of the present disclosure may be implemented in other ways. The device embodiments described above are merely exemplary. For example, the unit division is merely a logical function division, and, in practice, the unit division may be implemented in other ways. For example, multiple units or components may be combined or may be integrated into another system, or some features may be omitted or not executed. Additionally, coupling, direct coupling or communication connection between the presented or discussed components may be indirect coupling or communication connection, via interfaces, between devices or units, and may be electrical, mechanical or in other forms.

The units described above as separate components may or may not be physically separated. Components presented as units may or may not be physical units, i.e., may be located in one place or may be distributed over multiple network units. Part or all of these units may be selected according to actual requirements to achieve objects of solutions of embodiments of the present disclosure.

Moreover, various function units in embodiments of the present disclosure may all be integrated in one processing module, or each unit may be used as a separate unit, or two or more units may be integrated into one unit. The integrated function unit may be implemented by hardware or may be implemented by hardware plus a software function unit.

It may be understood by those skilled in the art that all or part of the steps in the method embodiments described above may be implemented by hardware related to program instructions, these programs may be stored in a computer-readable storage medium, and, when executed, these programs execute steps included in the method embodiments described above; and the preceding storage media includes various media capable of storing program codes, such as a removable storage device, a Read-Only memory (ROM), a Random Access Memory (RAM), a magnetic disk or an optical disk.

The above is only the specific embodiments of the present disclosure, but the scope of the present disclosure is not limited thereto, and modifications made in accordance with the principles of the present disclosure should be understood as falling within the scope of protection of the present disclosure.

What is claimed is:

1. A resource request method, comprising:
   transmitting, by a user equipment (UE) to a base station, a Side-link UE Information message including low latency traffic information for the base station to perform semi-persistent scheduling resource allocation for a vehicle-to-everything (V2X) traffic according to the low latency traffic information, the low latency traffic information comprising:
   a priority parameter indicating a priority of a type of the V2X traffic among a plurality of types of the V2X traffic;
   resource periodicity indicating a transmission period of the V2X traffic;
   an offset indicating an expected sub-frame to be allocated;
   resource size information indicating a size of the resources to be allocated; and
   a first logical channel identity (LCID) information indicative of a logical channel associated with the V2X traffic; and
   receiving, by the UE, resource allocation information of at least one semi-persistent scheduling resource from the base station.

2. The method of claim 1, wherein the low latency traffic information further comprises at least one of the following:
   a first Quality of Service (QOS) Class Identifier (QCI) indication information indicating a latency or a reliability requirement level of the V2X traffic;
   moving speed level indication information indicating a moving speed level of the UE; or
   Buffer State Report (BSR) information indicating buffer state information of the V2X traffic for which the resources are requested.

3. The method of claim 1, wherein the low latency traffic information comprises information indicating that the semi-persistent resources are transmitted via a Uu interface.

4. The method of claim 1, further comprising:
   transmitting geographic location information of the UE to the base station.

5. The method of claim 1, wherein the low latency traffic information comprises information indicating that the semi-persistent resource is transmitted via a PC5 interface.

6. A resource allocation method, comprising:
   receiving, by a base station from a user equipment (UE), a Side-link UE Information message including low latency traffic information for the base station to perform semi-persistent scheduling resource allocation for a vehicle-to-everything (V2X) traffic according to the low latency traffic information, wherein the low latency traffic information comprises:
   a priority parameter indicating a priority of a type of the V2X traffic among a plurality of types of the V2X traffic;
   resource periodicity indicating a transmission period of the V2X traffic;
   an offset indicating an expected sub-frame to be allocated;
   resource size information indicating a size of the resources to be allocated; and
   a first logical channel identity (LCID) information indicative of a logical channel associated with the V2X traffic;
   performing, by the base station, semi-persistent scheduling resource allocation according to the low latency traffic information; and
   transmitting, by the base station, resource allocation information of at least one semi-persistent scheduling resource to the UE.

7. The method of claim 6, wherein the low latency traffic information comprises information indicating that the semi-persistent resource is transmitted via a Uu interface.

8. The method of claim 6, wherein the low latency traffic information comprises information indicating that the semi-persistent resource is transmitted via a PC5 interface.

9. The method of claim 6, further comprising:
   receiving geographic location information from the UE by the base station.

10. The method of claim 6, further comprising:
    receiving geographic location information of the UE.

11. A user equipment (UE), comprising a processor, and a storage device for storing computer executable instructions that when executed by the processor cause the processor to:
    transmit to a base station, a Side-link UE Information message including low latency traffic information for the base station to perform semi-persistent scheduling resource allocation for a vehicle-to-everything (V2X) traffic according to the low latency traffic information, the low latency traffic information comprising:
    a priority parameter indicating a priority of a type of the V2X traffic among a plurality of types of the V2X traffic;
    resource periodicity indicating a transmission period of the V2X traffic;
    an offset indicating an expected sub-frame to be allocated;
    resource size information indicating a size of the resources to be allocated; and
    a first logical channel identity (LCID) information indicative of a logical channel associated with the V2X traffic; and
    receive resource allocation information of at least one semi-persistent scheduling resource from the base station.

12. The UE of claim 11, wherein the low latency traffic information includes information indicating that the semi-persistent resources are transmitted via a Uu interface.

13. The UE of claim 11, wherein the low latency traffic information includes information indicating that the semi-persistent resources are transmitted via a PC5 interface.

14. The UE of claim 11, wherein the computer executable instructions, when executed by the processor, cause the processor to transmit geographic location information of the UE to the base station.

15. A base station, comprising a processor, and a storage device for storing computer executable instructions that when executed by the processor cause the processor to:
    receive, from a user equipment (UE), a Side-link UE Information message including low latency traffic information for the base station to perform semi-persistent scheduling resource allocation for a vehicle-to-everything (V2X) traffic according to the low latency traffic information, wherein the low latency traffic information comprises:

a priority parameter indicating a priority of a type of the V2X traffic among a plurality of types of the V2X traffic;

resource periodicity indicating a transmission period of the V2X traffic;

an offset indicating an expected sub-frame to be allocated;

resource size information indicating a size of the resources to be allocated; and a logical channel identity (LCID) information indicative of a logical channel associated with the V2X traffic;

perform semi-persistent scheduling resource allocation according to the low latency traffic information; and transmit resource allocation information of at least one semi-persistent scheduling resource to the UE.

16. The base station of claim 15, wherein the low latency traffic information includes at least one of:

information indicating that the semi-persistent resources are transmitted via a Uu interface; or information indicating that the semi-persistent resources are transmitted via a PC5 interface.

17. The base station of claim 15, wherein the computer executable instructions, when executed by the processor, cause the processor to receive geographic location information of the UE.

* * * * *